United States Patent [19]

Uramoto et al.

[11] Patent Number: 5,095,527
[45] Date of Patent: Mar. 10, 1992

[54] ARRAY PROCESSOR

[75] Inventors: Shin-ichi Uramoto; Hideyuki Terane, both of Itami, Japan

[73] Assignee: Mitsubishi Denki Kabushiki Kaisha, Tokyo, Japan

[21] Appl. No.: 649,336

[22] Filed: Jan. 31, 1991

Related U.S. Application Data

[63] Continuation of Ser. No. 264,222, Oct. 28, 1988, abandoned.

[30] Foreign Application Priority Data

Aug. 18, 1988 [JP] Japan ............... 63-205560

[51] Int. Cl.$^5$ ............................................. G06F 15/80
[52] U.S. Cl. ........................ 395/800; 364/DIG. 1; 364/231.9; 364/241.9; 364/260
[58] Field of Search ................... 364/200, 900

[56] References Cited

U.S. PATENT DOCUMENTS

| | | | |
|---|---|---|---|
| 4,107,773 | 8/1978 | Gilbreath et al. | 364/200 |
| 4,760,525 | 7/1988 | Webb | 364/200 |
| 4,905,143 | 2/1990 | Takahashi et al. | 364/200 |
| 4,907,148 | 3/1990 | Morton | 364/200 |
| 4,922,418 | 5/1990 | Dolecek | 364/200 |

OTHER PUBLICATIONS

Kondo et al., "An LSI Adaptive Array Processor", IEEE Journal of Solid-State Circuits, vol. SC-18, No. 2, Apr. 1983, pp. 147-156.
"Geometric Arithmetic Parallel Processor" NCR 45CG72, National Cash Register, Inc., U.S.A. (1984).

*Primary Examiner*—Gareth D. Shaw
*Assistant Examiner*—John Loomis
*Attorney, Agent, or Firm*—Townsend and Townsend

[57] ABSTRACT

A novel array processor is provided with a plurality of local memories in each data processing element and allows these local memories to be accessed simultaneously, so that a plurality of local memories provided for each data processing element can simultaneously be accessed. The array processor is also has one local memory which is provided with a plurality of output ports for each data processing element, so that all the output ports can simultaneously be accessed, permitting the local memory unit to be accessed simultaneously through a plurality of output ports. The array processor of the present invention decreases the number of memory accesses in each data processing element, with the cumulative effect of achieving a faster speed for the entire data processing system.

2 Claims, 5 Drawing Sheets

5,095,527

ARRAY PROCESSOR

This is a continuation of application Ser. No. 07/264,222, filed 10-28-88, now abandoned.

BACKGROUND OF THE INVENTION

1. Field of the Invention

The present invention relates to an array processor which processes data in parallel with each other by means of a plurality of data processing elements disposed in matrix formation.

2. Description of the Prior Art

FIG. 1 is the simplified block diagram of a conventional array processor, in which nine data processing elements (PE) 11a through 11i are disposed in matrix formation composed of 3 lines and 3 rows, while adjoining data processing elements (PE) 11a through 11i are connected to each other by means of input/output lines 12a through 12l.

FIG. 2 is the schematic block diagram of one of the identical data processing elements (PE) 11a through 11i constituting the conventional array processor cited above. Note that FIGS. 1 and 2 respectively show the simplified block diagrams of those which are presented in the specification of "GEOMETRIC ARITHMETIC PARALLEL PROCESSOR", NCR 45CG72, a product of National Cash Register, Inc., U.S.A..

Refer now to FIG. 2. In the arithmetic parallel processor numeral/designates an arithmetic and logical unit (ALU). The ALU 1 receives data from the first and second registers 2a and 2b and executes arithmetic logical operation using operands composed of these data. The ALU 1 directly feeds the result back to the first register 2a or delivers it to local memory unit 3 for storage.

In addition to those data delivered from local memory unit 3, registers 2a and 2b respectively receive data from an input/output line 6 through an interface circuit 5.

The local memory unit 3 stores data delivered from the interface circuit 5 or from the registers 2a and 2b or from the ALU 1. The local memory unit 3 then outputs data to any of these. The local memory unit 3 receives and outputs data in accordance with incoming address input 4c delivered from external sources.

The interface circuit 5 is connected to the registers 2a, 2b and the local memory unit 3, while it is also connected to external sources through the input/output line 6.

Next, functional operation of the conventional array processor cited above is described below.

On receipt of data from the registers 2a and 2b, the ALU 1 first executes arithmetic logical operation using operands composed of these data. The ALU 1 then outputs the result to the first register 2a and local memory unit 3. The local memory unit 3 then delivers data to the registers 2a and 2b or to the interface circuit 5. The interface circuit 5 then transmits received data to external sources through the input/output line 6.

But, the ALU 1 cannot simultaneously execute those operations mentioned above using the same system.

As shown in FIG. 1, the array processor is composed of a plurality of data processing elements being disposed in a array form shown in FIG. 2. Consequently, since each data processing element PE of the array processor simultaneously executes those operations mentioned above in parallel with each other, the entire system can process data at a very fast speed.

As mentioned above, the conventional array processor cited above can execute data processing operations at a very fast speed, however, due to the conventional constitution of individual data processing elements, each data processing element is merely provided with a single local memory unit. As a result, in order to read a plurality of data needed for execution of the operation of ALU 1 from local memory unit 3 for delivery to registers 2a and 2b feeding data to ALU 1, it is essential for the array processor to access local memory unit 3 a specific number of times corresponding to the number of data. Thus, by executing memory accessing operations many times, operating efficiency of the ALU 1 is eventually lowered. This in turn prevents the array processor from accelerating the data processing operation.

When executing addition of two numbers, the conventional array processor must sequentially execute the following operations. First, the first register 2a reads the first number from local memory unit 3 and then stores it. Next, the second register 2b reads the second number from local memory unit 3 and then stores it. Finally, the ALU 1 reads both numbers from registers 2a and 2b before eventually executing addition of both numbers.

SUMMARY OF THE INVENTION

The primary object of the invention is to overcome those problems mentioned above by providing a novel array processor which securely executes data processing operations at an extremely fast speed by decreasing the number of accessing local memory unit without increasing the number of control input delivered to each data processing element of the array processor.

According to the array processor of the first preferred embodiment of the present invention, the array processor is provided with a plurality of local memories in each data processing element so that all the local memories can simultaneously be accessed. According to the array processor of the second preferred embodiment of the invention, the array processor is provided with a local memory which incorporates a plurality of output ports in each data processing element so that these output ports can simultaneously be accessed.

As a result, the first preferred embodiment allows a plurality of local memories in each data processing element to be accessed simultaneously. The second preferred embodiment of the array processor related to the invention allows simultaneous access for one local memory through a plurality of output ports.

The above and further objects and features of the invention will more fully be apparent from the following detailed description with accompanying drawings.

DESCRIPTION OF THE PREFERRED EMBODIMENTS

Referring now more particularly to the accompanying drawings, preferred embodiments of the array processor related to the invention are described below.

Figure 1:
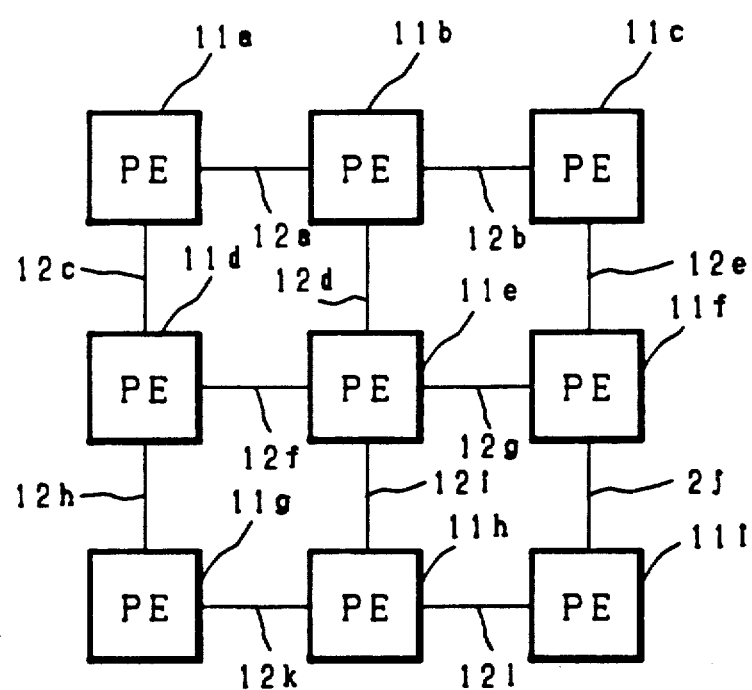
FIG. 1 is the simplified block diagram of data processing elements of conventional array processor.
Figure 2:
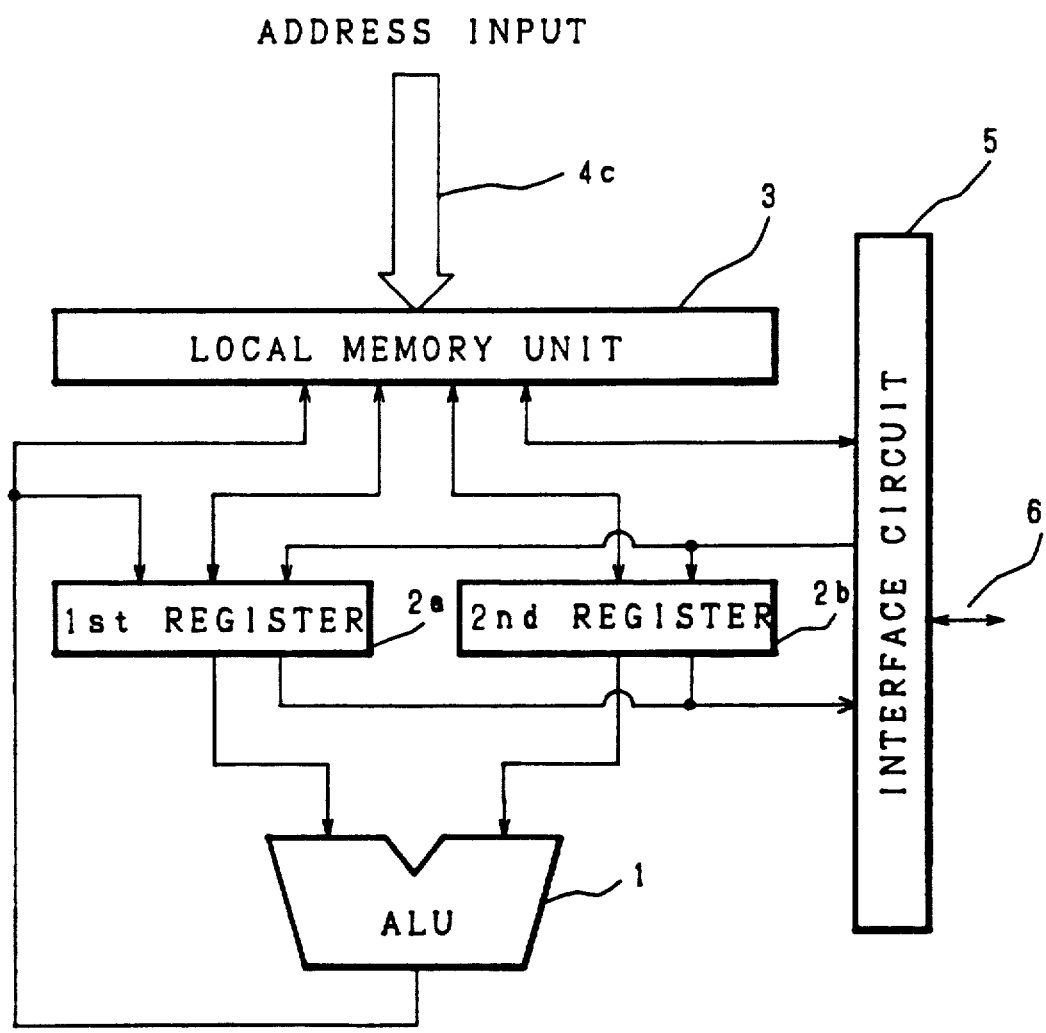
FIG. 2 is the schematic block diagram of the entire constitution of a conventional array processor.
Figure 3:
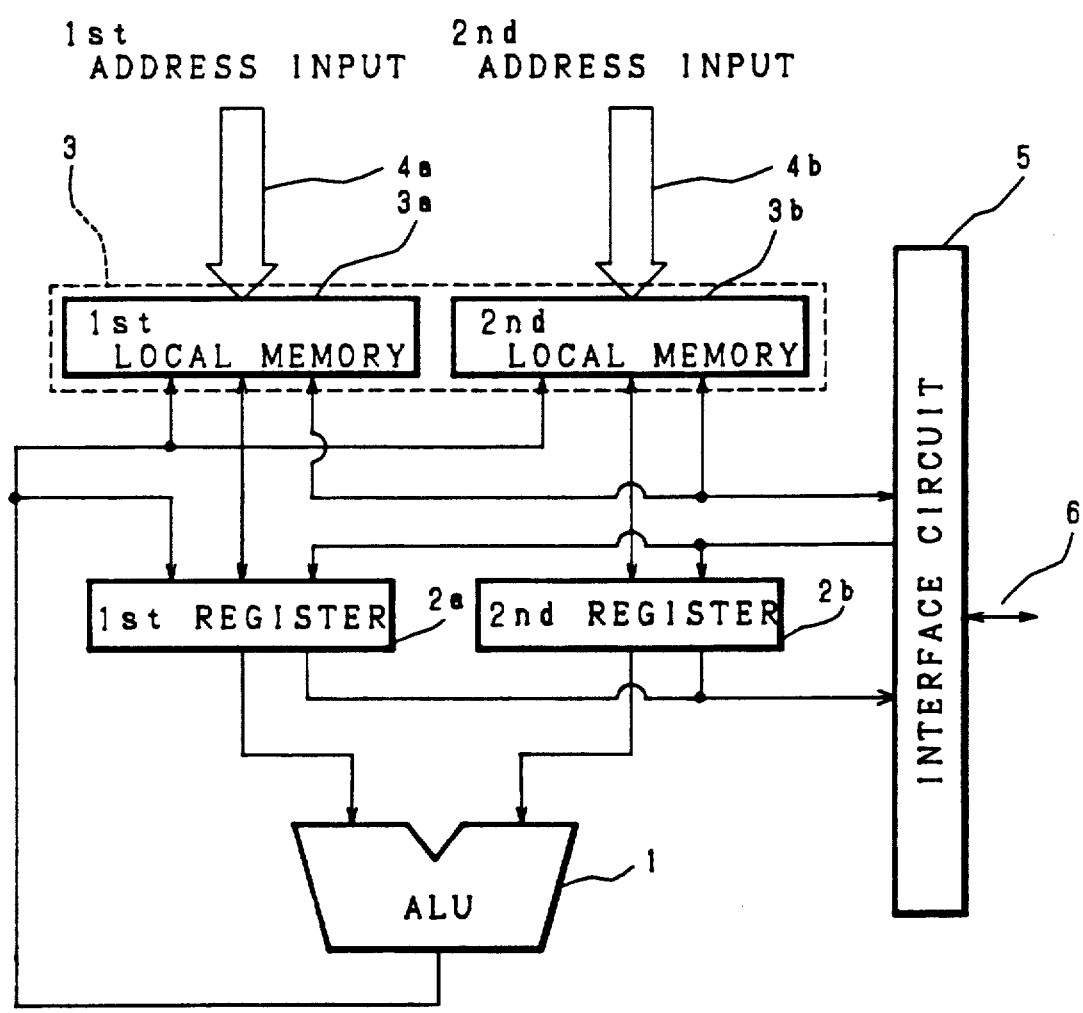
FIG. 3 is the schematic block diagram of the data processing element of the first preferred embodiment of the array processor related to the invention.

FIG. 3 is the schematic block diagram of the data processing element of the array processor related to the first preferred embodiment of the invention. Note that the configuration of the array processor related to the invention is similar to that of the conventional array processor shown in FIG. 1. Those constituents of the array processor related to the invention being identical to those of the conventional array processor are provided with identical reference numerals.

An arithmetic and logic unit (ALU) 1 shown in FIG. 3 receives data from registers 2a and 2b, and then, it executes arithmetic logical operations using operands composed of those received data. The ALU 1 directly feeds the result of arithmetic logic operation back to the first register 2a or delivers it to a local memory unit 3 for storage.

In addition to those data from the local memory unit 3, registers 2a and 2b respectively receive data from an input/output line 6 through an interface circuit 5.

The local memory unit 3 of the array processor related to the invention is also composed of first and second local memories 3a and 3b, which respectively store data delivered from the interface circuit 5 or from the ALU 1 before delivering these data to these constituents. However, the array processor related to the invention allows each of the registers 2a and 2b to independently and simultaneously be accessed. The local memories 3a and 3b respectively receive and output data in accordance with incoming address inputs 4a and 4b delivered from external sources.

The interface circuit 5 is connected to the registers 2a, 2b and the local memories 3a and 3b, while this circuit 5 is also connected to external sources through the input/output line 6.

Next, functional operation of the array processor related to the invention is described below.

On receipt of data from the registers 2a and 2b, the ALU 1 executes arithmetic logical operations using operands composed of these data, and then, it outputs the result to the first register 2a and local memory unit 3 composed of the local memories 3a and 3b. The local memories 3a and 3b respectively deliver and receive data to and from the first and second registers 2a and 2b and interface circuit 5. The interface circuit 5 delivers and receives data to and from external sources through the input/output line 6.

The first register 2a is connected to the first local memory 3a and input and output of the ALU 1, whereas the second register 2b is connected to the second local memory 3b and input of the ALU 1. Accordingly, the array processor related to the invention can simultaneously execute reading of data from the local memories 3a and 3b for delivery to the registers 2a and 2b, transmission and receipt of data to and from external sources through the interface circuit 5, and operation for accessing the first and second local memories 3a and 3b, respectively.

When executing addition of two numbers for example, first, the local memories 3a and 3b respectively receive data related to two numbers to be added, and then, the registers 2a and 2b respectively read these data from the local memories 3a and 3b for storage, and finally, the ALU 1 reads these data from the registers 2a and 2b before eventually executing adding operation. Consequently, the array processor related to the invention executes one operation for accessing local memory unit 3 at every execution of adding operation. This in turn allows the ALU 1 to achieve faster operating speed than the ALU of any conventional counterpart.

In the light of restricted availability of area in an integrated circuit, data processing elements of the array processor should desirably be provided with a simple constitution. When executing complex arithmetic logical operations, array processor needs to repeatedly execute simple arithmetic operations many times as was done for the addition of two numbers cited above. Thus, it is possible for the array processor to sharply accelerate the data processing speed by being provided with the local memory unit 3 composed of two local memories 3a, 3b to allow the registers 2a and 2b to simultaneously and independently access both of these memories in the same way as was done for the above preferred embodiment.

Figure 4:
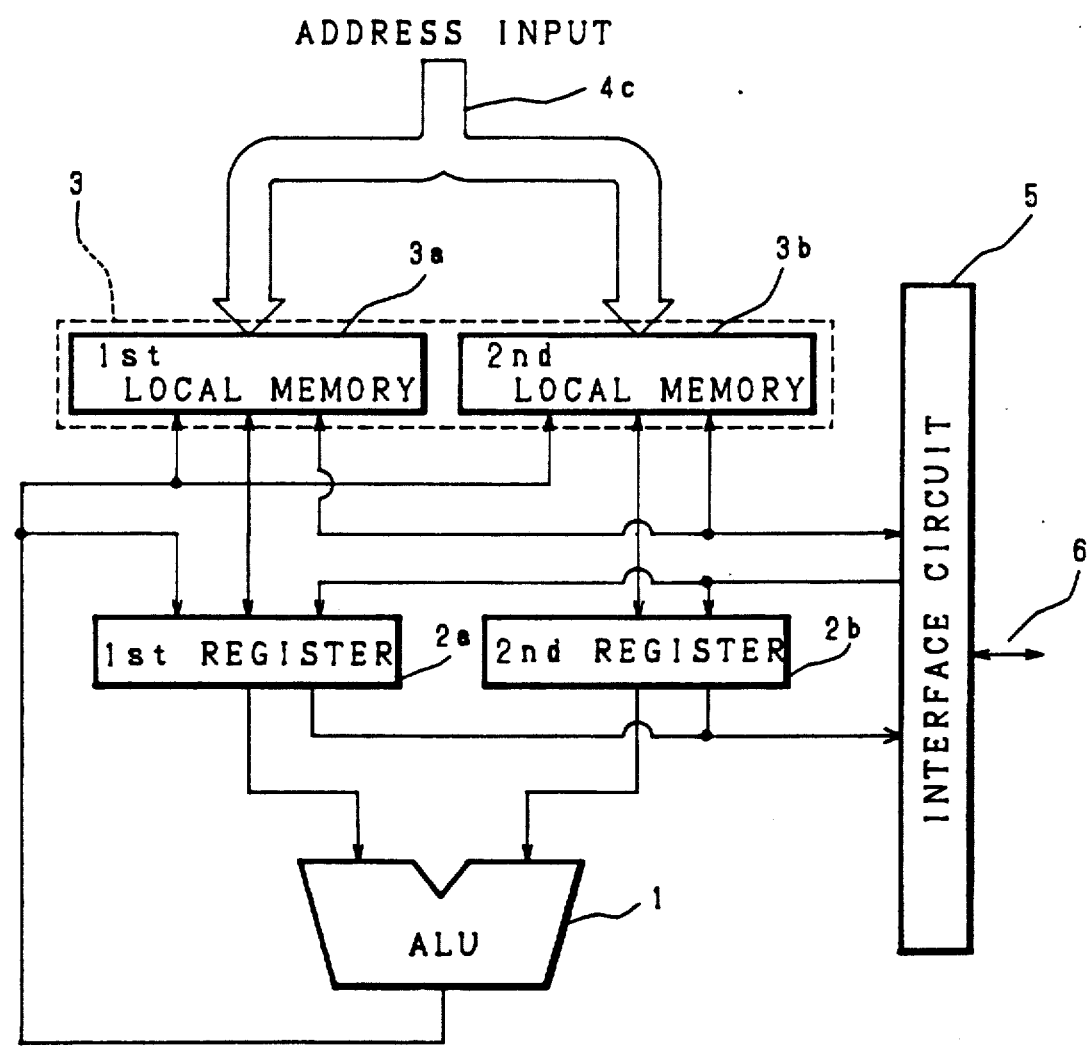
FIG. 4 is the schematic block diagram of another preferred embodiment of the array processor having a single address input terminal.

The above preferred embodiment introduces the constitution in which each two units of registers and local memories are provided. Needless to say that the array processor related to the invention also allows provision of more than two of registers and local memories as well. In addition, the array processor shown in the above preferred embodiment independently controls addresses of the local memories 3a and 3b of local memory unit 3 by using the first and second address input signals 4a, 4b. However, as shown in FIG. 4, it is also possible for the array processor related to the invention to properly control addresses of local memories 3a and 3b by using the identical address input signal 4c. In this case, when executing addition of two numbers for example, the array processor first delivers the identical address input signal 4c to the local memories 3a and 3b to allow the identical address to store data related to addition of two numbers, and finally, the registers 2a and 2b respectively read these data from the identical address. This eliminates the needs for increasing the number of control lines connected to each data processing element. In other words, it is not necessary for the system to increase the numbers of the address input signal 4c and the accompanying control signals.

Figure 5:
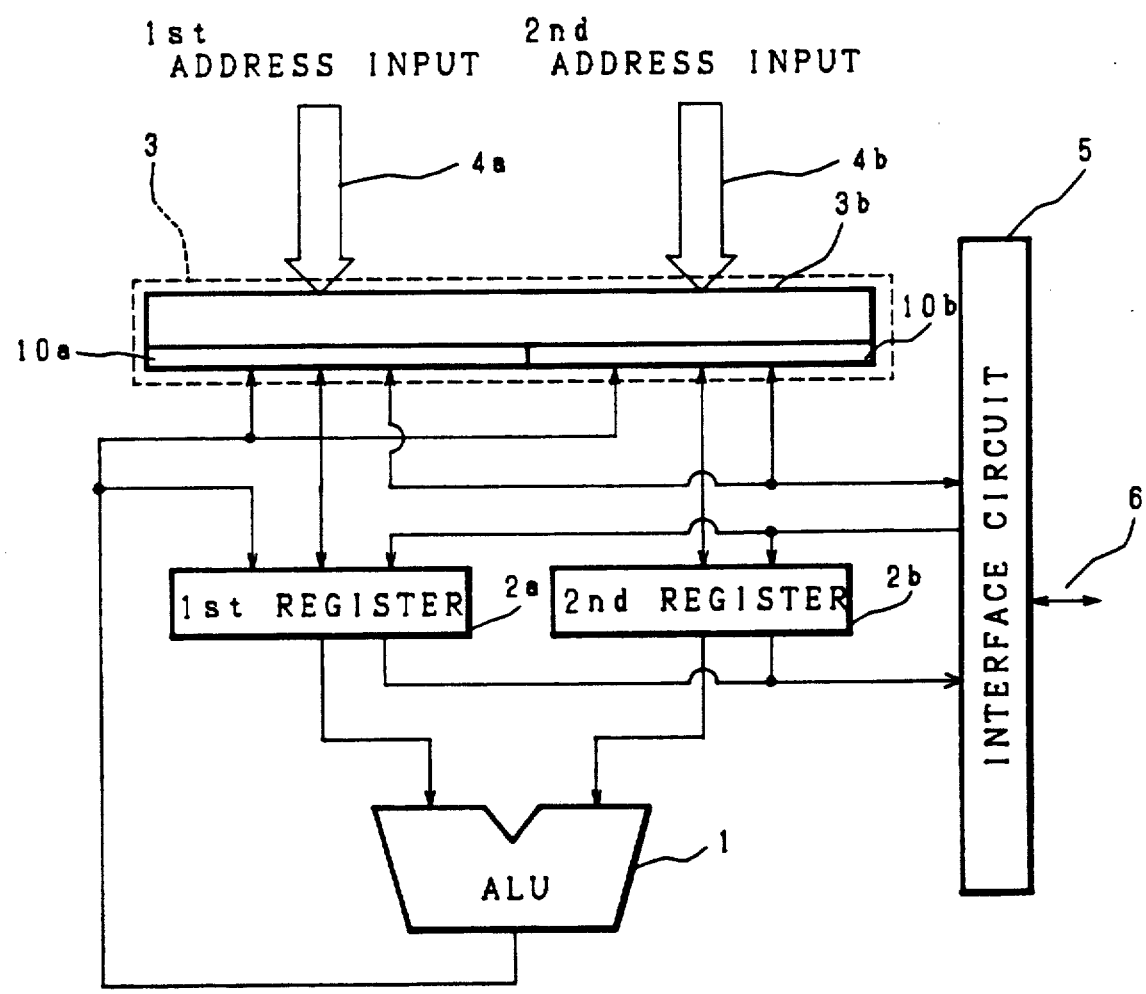
FIG. 5 is the schematic block diagram of the data processing element of the second preferred embodiment of the array processor related to the invention.

The array processor shown in the above preferred embodiment is provided with a local memory unit 3 composed of local memory 3a and 3b. However, it is also possible for the array processor related to the invention to constitute local memory unit 3 using a single memory incorporating a plurality of output ports as shown in FIG. 5 presenting the second preferred embodiment of the invention. Refer now to FIG. 5, the local memory unit 3 is provided with a first output port 10a and a second output port 10b, respectively, corresponding to registers 2a, 2b. This constitution allows the array processor to execute those operations identical to those which are done by the foregoing preferred embodiment by connecting the first output port 10a to the input/output terminal of the first local memory 3a and the second output port 10b to the input/output terminal of the second local memory 3b shown in FIG. 3.

As is clear from the foregoing description, according to the array processor related to the invention, the local memory unit of each data processing element is composed of a plurality of independent memories which can be accessed simultaneously. Alternatively, the array processor related to the invention is provided with a single memory which is provided with a plurality of output ports through which data can simultaneously be read out. Consequently, data processing speed of the ALU in each data processing element is sharply accelerated, thus allowing the array processor related to the invention to process data at a speed faster than any of those conventional array processors.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A data processing element disposed in a processor system including a plurality of data processing elements, comprising:
   an arithmetic logic unit (ALU) including,
      a first ALU input port,
      a second ALU input port, and
      an ALU output port;
   an interface circuit for inputting data to and outputting data from the data processing element with respect to a second data processing element in the array coupled to said interface circuit including,
      a first interface data port,
      a second interface data port,
      an interface input port, and
      an interface external port for interfacing said processing element with said second data processing element;
   a first independently addressable local memory including,
      a first local memory data port coupled to said ALU output port for receiving data from said ALU,
      a second local memory data port coupled to said second interface data port for receiving data from and outputting data to said interface circuit,
      a first local memory input port for receiving data to be stored in said first local memory, and
      a first local memory address port for receiving externally supplied addresses of data stored in said first local memory;
   a second independently addressable local memory including,
      a third local memory data port coupled to said ALU output port for receiving data from said ALU,
      a fourth local memory data port coupled to said second interface data port for receiving data from and outputting data to said interface circuit,
      a second local memory input port for inputting data to be stored in said second local memory, and
      a second local memory address port for receiving externally supplied addresses of data stored in said second local memory;
   a first register including,
      a first register input port coupled to said ALU output port for receiving data from said ALU,
      a second register input port coupled to said first interface data port for receiving data from said interface circuit,
      a first register data port coupled to said first local memory input port for receiving data from said first local memory,
      a first register output port coupled to said first ALU input port for outputting data to said ALU, and
      a second register output port coupled to said interface input port for outputting data to said interface circuit; and
   a second register including,
      a third register input port coupled to said first interface data port for receiving data from said interface circuit,
      a second register data port coupled to said second local memory input port for receiving data from said second local memory,
      a third register output port coupled to said second ALU input port for outputting data to said ALU, and
      a fourth register output port coupled to said interface input port for outputting data to said interface circuit.

2. The apparatus of claim 1 wherein said first and second local memory address ports are connected to receive the same addresses.

* * * * *